2,902,338

SEPARATION OF THORIUM FROM URANIUM

Ralph W. Bane, Chicago, Ill., assignor to the United States of America as represented by the United States Atomic Energy Commission No Drawing. Application October 6, 1949
Serial No. 119,997

6 Claims. (Cl. 23—14.5)

The present invention is concerned with the separation of heavy metals, and particularly with the separation of thorium from uranium.

The predominant natural uranium isotope, $U^{238}$, is a naturally radioactive isotope and decays by alpha-emission with a long half-life of $4.5 \times 10^9$ years to form a thorium isotope, $Th^{234}$, also known as $UX_1$. The thorium isotope is also radioactive, decaying with beta-emission with a short half-life of 24.5 days. Because of the long half-life of $U^{238}$ and the short half-life of $Th^{234}$, $Th^{234}$ is always present in natural uranium, usually in very small concentrations. $Th^{234}$ has been found to be a highly desirable isotope to use in the radioactive tracer chemistry of thorium. However, because of its very small concentration in natural uranium, it is quite difficult to obtain by ordinary chemical methods. A method of thorium and uranium separation, which would be effective in removing the very minute concentrations of thorium found in natural uranium due to the radioactive decay of $U^{238}$, would be a highly desirable process.

Most thorium ores also contain uranium in greater or lesser percentages. It is therefore highly desirable to have an efficient method of separating thorium and uranium where the various constituents are present in macro amounts.

It is an object of the present invention to provide an efficient method of separating thorium and uranium.

It is a further object of this invention to provide a method of separating thorium and uranium where the thorium is present as $UX_1$ ($_{90}Th^{234}$) in equilibrium concentration with its uranium parent, $U^{238}$.

Still other objects will be apparent from the following detailed description.

It has been found that by the process of this invention thorium may be quantitatively separated from uranium even when the thorium is present in tracer concentrations and in concentrations exceedingly minute in comparison to the uranium concentrations. The process comprises, broadly, the formation of an aqueous solution containing ionic species of thorium, uranium with the uranium preferably in the uranyl state, and ions which will complex the uranium ions but will not affect the thorium ions, such as ions of hydroxylamine hydrochloride. This solution is then contacted with an adsorbent preferably of the cation exchange resin type whereby substantially all of the thorium is adsorbed thereon. The uranium has an adsorptive affinity for the resin which is much less than that of the thorium so that substantially all, or only a portion, of the uranium present may be adsorbed, depending on the amount of resin used. The resin is separated from the solution and the uranium then desorbed from the resin by contacting the resin with a dilute aqueous acidic solution. The thorium can then be desorbed from the adsorbent by contacting the adsorbent with a suitable desorption medium for thorium.

In the preferred embodiment of this invention, the solution is prepared by dissolving the thorium-uranium mixture in a suitable aqueous acidic solution. The acid used should be one, the anion of which does not form a complex with thorium, but an acid may be used, the anion of which does form a complex with uranium. Suitable acids include nitric acid and hydrochloric acid. The concentration of the acid is not critical. Solutions should be maintained on the acid side, however, to avoid precipitation of the thorium or uranium hydroxides and the hydrogen ion concentration should not be so high as to seriously attack the resin or adsorbent used in the separation. A complexing agent which will complex uranyl ion but will not affect the thorium ion is introduced into the solution. Such a complexing agent is a hydroxylamine salt. The preferable form of the hydroxylamine salt is the hydrochloride since the chloride ion does not complex the thorium ion whereas the sulfate of the hydroxylamine sulfate salt might have some tendency to complex the thorium and prevent complete adsorption. The amount of hydrochloride used in relation to the amount of uranium ion present is not critical and may range from 0.25–5 parts hydroxylamine salt to 1 part uranium, but it has been found that for maximum complexing effect, about 7 g. of hydroxylamine per 5 g. of uranium is optimum. The uranyl concentration of the solution should not be too high and ordinarily is maintained between about 0.05 and 1 M with the preferable range between 0.1 and 0.2 M. The thorium concentration should also be limited so that it does not exceed about 1 M. In many cases, of course, the thorium concentration will be very small, ranging from less than $10^{-8}$ to $10^{-3}$ M.

The adsorbent used may be any adsorbent which has a greater affinity for thorium than it does for uranium. The preferred adsorbents are the cation exchange resins. Examples of suitable resins include the phenol-formaldehyde polymers containing free methylene sulfonic acid, carboxyl and phenolic groups described in U.S. Patents 2,104,501 (January 4, 1948), 2,151,883 (March 28, 1938), and 2,191,853 (February 27, 1940), and the cross-linked aromatic hydrocarbon polymeric resins containing nuclear sulfonic acid groups and belonging to the class of compounds described in U.S. Patent 2,366,007 (December 26, 1944). The average particle size of the resin is not critical and may vary widely. It has been found, however, that in most applications from 40–100 mesh sizes give very desirable results. While the hydrogen type of resin is normally used, the cation of the prepared resin may be any cation having a lesser affinity for the resin than thorium. Thus, suitable resins include the uranyl, sodium, potassium and ammonium types.

There are, in general, two methods of contacting adsorbents with solutions which are used in the separation of ionic species. These types are the batch method and the column adsorption method; each method includes many variants. It is believed that the process of the present invention may be adapted to any of these methods or variants but the preferred method is the column adsorption method. By this method, the adsorbent is placed in an elongated column and the solution containing the ionic species to be adsorbed is flowed through the column. The thorium ions have a much greater adsorptive affinity for the resin than do the uranium ions so that the thorium ions and uranium ions will tend to be adsorbed in separate zones of the resin with the thorium zone lying closer to the influx end of the column than the uranium zone. Thus, merely passing the aforementioned solution containing values of thorium and uranium and a complexing agent through the adsorbent will result in a separation of thorium and uranium ions. It is nearly always desirable, however, to obtain the species in separate solutions. There are several methods of accomplishing this, including such method as the physical separation of the zones of resin containing the separate species and the separate elution therefrom of the species. Another method is by the use of the same eluant for both species whereby the eluant is passed through the column in the same direction as the original solution from which the species were adsorbed. Continued passage of the solution results in the continuous adsorption and desorption of the separate layers of adsorbed substances so that these layers become progressively lowered in the case of downward flow of the solution in the column. By this progressive lowering of the adsorbed strata, the adsorbed species will eventually pass out of the column in the effluent solution in separate portions thereof, thus making it possible to obtain effluent portions containing the individual species desired. A third and probably the most efficient method of removing the adsorbed species is the method of using selective eluants. In this method the first solution introduced is selected so that it will remove the ionic species having the lesser affinity for the adsorbent, in this instance uranium, with the least possible desorption of the ionic species, thorium, having the greater adsorptive affinity. In the present instance, we have found that dilute solutions of strong acids are preferable for the uranium desorbent medium, for example, nitric acid, sulfuric acid or hydrochloric acid, in less than about one-half molar strength. Particularly advantageous results may be obtained by using a dilute hydrochloric acid desorbent for the uranium since hydrochloric acid has no complexing effect on thorium and therefore has very little tendency to remove the thorium. The hydrochloric acid is also somewhat less efficient for removal of the uranium but because the use of the complexing agent for the uranium in the solution from which the uranium and thorium are adsorbed results in very little uranium being adsorbed upon the column, the hydrochloric acid is efficient enough to remove substantially all of the uranium adsorbed without affecting the thorium. The second solution introduced in the column is one selected to remove the more tightly-bound adsorbed ionic species in the least possible quantity of solution. Such a solution for thorium is preferably an aqueous acidic solution which contains ions which have a complexing effect upon the thorium ions. Solutions which have been found to be preferable include 0.5 M oxalic acid solutions and 1.25 M bisulfate solutions. Since the desorption of the ions is an equilibrium effect, considerable variation in the molarity of the solutions may be permitted by the use of increased or decreased amounts of the total solution used. The use of the preferred types in the preferred molar ranges of desorbent solutions can, however, result in considerable concentration of the thorium over the concentration of the thorium in the original solution.

Now that the process of this invention has been broadly described, a specific application, wherein the process is used as an analytical method of determining the thorium present in a thorium-uranium alloy, is illustrated by the following example.

EXAMPLE

A column was prepared of a piece of Pyrex glass tube 10 mm. inside diameter. A plug of glass wool was inserted at the bottom end of the tube. A water slurry of a phenolformaldehyde type cation exchange resin 40–60 mesh was poured into the tube to form a column about 8 in. long. The resin was converted to the hydrogen type by passing 50 ml. of hydrochloric acid (1:1) through the tube. The resin was then washed free of acid with distilled water. A uranium-thorium solution was then prepared by dissolving an alloy of uranium-thorium in nitric acid (3:1). The solution was evaporated until thick and syrupy to eliminate excess acid. The particular resin used was somewhat susceptible to attack by more concentrated nitric acid so that in this particular case it was desirable that the solution to be passed through the resin not exceed 0.1 N in nitric acid. More concentrated acid influents can be used where the resin used is less susceptible to attack by acid. Distilled water was then added until the volume of the solution was about 150 ml. of solution per 5 g. of uranium present. Hydroxylamine hydrochloride was added to the solution in the proportions shown in the table. The solution was then separated into individual samples, each sample containing 59.0 mg. of thorium and 6.0 g. of uranium. Each sample of solution was then separately passed through the column at a rate of about 1 ml./min. The uranium of each sample was eluted from the column by passing through the column 100 ml. of 0.5 M hydrochloric acid. A final portion of the uranium eluate was tested with potassium ferrocyanide to determine that it was free of uranium, thus indicating that all uranium had passed through. The thorium was then eluted from the column by passing 50 ml. of 1.25 M sodium bisulfate through the column followed by 50 ml. of distilled water. A tabulation of three samples is shown in the table which follows.

Table

| Sample Influent | | | | Uranium eluted with— | Th recovered | |
|---|---|---|---|---|---|---|
| Th, g. | NH$_2$OH·HCl, g. | U, g. | Volume, ml. | | mg. | Percent |
| 0.059 | 7 | 6 | 150 | 100 ml. 0.5 M HCl. | 58.1 | 98.5 |
| 0.059 | 7 | 6 | 150 | 100 ml. 0.5 M HCl. | 58.7 | 99.5 |
| 0.059 | 12 | 6 | 150 | 100 ml. 0.5 M HCl. | 58.6 | 99.3 |

It will be apparent to those skilled in the art that the method of separating thorium from uranium, as generally set forth above, provides a simple and practical procedure for the procurement of a high degree of separation in a single step. While this invention has been illustrated by a restricted application thereof, it is not desired to be specifically limited thereto, since it is manifest to those skilled in the art to which the present invention is directed that it is susceptible to numerous alterations and modifications without departing from the scope thereof. Thus, while it is illustrated with a column adsorption method using selective eluants, it is susceptible to use in numerous variations of the column adsorption technique and also in the batch adsorption techniques. In general, it may be said that any process for the separation of thorium from uranium wherein the influent solution in the adsorption step contains a complexing agent which will complex the uranium but not the thorium is to be construed as lying within the scope of our invention.

What is claimed is:

1. The process of separating thorium from uranium, which comprises forming an aqueous acidic solution containing ionic species of thorium, uranyl uranium and hydroxylamine, and flowing said solution through an adsorbent column containing a cation exchange resin whereby substantially all of the thorium values and a portion of the uranium values are selectively adsorbed.

2. The process of separating thorium values from uranium values, which comprises flowing an aqueous acidic solution containing ionic species of thorium, uranyl uranium and hydroxylamine through a column containing a cation exchange adsorbent resin whereby substantially all of the thorium values and a portion of the uranium values are selectively adsorbed, eluting the uranium values, and then separately eluting the thorium values.

3. The process of separating thorium values from uranium values, which comprises flowing a dilute aqueous solution of a strong acid containing ionic species of thorium, uranyl uranium and hydroxylamine through a column containing a cation exchange adsorbent resin whereby substantially all of the thorium values and a portion of the uranium values are selectively adsorbed, flowing a dilute solution of a strong acid through the column whereby the uranium values are desorbed, then flowing a dilute aqueous acidic solution containing an ion which has a complexing effect upon thorium through the column whereby substantially all of the thorium is desorbed, and separately collecting the effluent.

4. The process of claim 3 wherein the resin is a phenol-formaldehyde polymer containing free methylene, sulfonic acid, carboxyl and phenolic groups.

5. The process of claim 3 wherein the resin is a cross-linked aromatic hydrocarbon polymeric resin containing nuclear sulfonic acid groups.

6. The process of separating thorium values from uranium values which comprises flowing an aqueous dilute nitric acid solution containing ionic species of thorium, uranyl uranium and hydroxylamine hydrochloride through a column containing a phenol-formaldehyde type cation exchange adsorbent resin whereby substantially all of the thorium values and a portion of the uranium values are selectively adsorbed, flowing a 0.5 M hydrochloric acid solution through the column whereby the uranium values are eluted and then flowing a 1.25 M solution of sodium bisulfate through the column whereby the thorium values are eluted, and separately collecting said thorium-containing eluate.

References Cited in the file of this patent

Tompkins et al.: "Ion-Exchange as a Separation Method," Journal of the American Chemical Society, vol. 69, pages 2769–2777 (1947).

Spedding et al.: "The Separation of Rare Earths by Ion Exchange," Journal of the American Chemical Society, vol. 69, pages 2777–2781 (1947).

Marinsky et al.: "The Chemical Identification of Radioisotopes of Neodymium and of Element 61," Journal of the American Chemical Society, vol. 69, pages 2781–2785 (1947).